Patented Sept. 6, 1938

2,129,323

UNITED STATES PATENT OFFICE

2,129,323

PROCESS FOR PREPARING CAMPHENE

Clyde O. Henke, Wilmington, Del., and Gastao Etzel, Pitman, N. J., assignors to E. I. du Pont de Nemours & Company, Wilmington, Del., a corporation of Delaware No Drawing. Application November 2, 1937, Serial No. 172,488

5 Claims. (Cl. 260—666)

This invention relates to improvements in terpene isomerization, and more particularly to an improved catalytic process for preparation of camphene from pinene and crude source materials containing pinene, by isomerization.

It is known to those experienced in this field of chemistry that catalysts of several different types can be used to facilitate the isomerization of pinene into camphene. For example, there may be mentioned as old in the art, finely divided metals; highly porous bodies such as charcoal, infusorial earth, and silica gel; salts of sulfuric acid such as magnesium and barium sulfates; clays, and oxides of vanadium, titanium, etc. Some of the catalysts heretofore used are objectionably costly, and all leave much to be desired in the matter of efficiency, so far as applicant has been able to learn from actual experience and published data on yields. With prior art catalysts applicant has not been able to obtain better than 30 to 40% yields of camphene and the best published figures he has seen have been 50 to 56%.

It is therefore an object of this invention to provide a catalytic process for the isomerization of pinene into camphene which, by employment of a more efficient catalyst, will make possible higher yields of camphene than are obtained by known methods. Another object is to provide a highly efficient catalytic process employing a comparatively inexpensive catalyst. Other objects of the invention will be apparent from the description which follows.

It has been discovered that vermiculite has properties which make it an outstandingly desirable catalyst for promoting the conversion of pinene into camphene. Vermiculite is a hydrated aluminum magnesium silicate, a non-metallic member of the mica family. It has a plate-like structure and is non-porous. The following is a typical analysis; silica 41%, iron oxide 7%, aluminum oxide 18%, magnesium oxide 21%, calcium oxide 1%, alkali (sodium and potassium) 1%, and moisture 11%. Crude vermiculite contains 7 to 9% of chemically combined moisture. "Zonolite" is a commercial name given to vermiculite. When vermiculite is heated at 1800 to 2000° F. the combined moisture is transformed into steam which in an effort to escape causes an explosive expansion of the plate-like particles to form a puffed mass having about 16 times the volume of the original material. The material before expansion is called crude vermiculite or crude "Zonolite" and after expansion it is known as expanded vermiculite or expanded "Zonolite".

In either form it is a suitable catalyst for the process of this invention.

The following examples fully set forth the process of this invention by which pinene is converted into isomeric camphene with the aid of vermiculite as catalyst. It is to be understood that the invention is not strictly limited to all details of the examples. Parts given in the examples refer to weight:

Example I

One hundred (100) parts of pinene and 3 parts of pulverized unexpanded vermiculite were charged into an iron autoclave. The mixture in the autoclave was agitated and heated at 165–175° C. for a period of 8 hours. At the end of the 8 hour period the mixture was cooled and the catalyst was filtered from the oily material. Camphene was then separated from other monoterpene hydrocarbons by fractional distillation. Sixty-seven per cent yield of camphene was obtained. In addition to camphene 32 per cent of other terpenes such as dipentene, terpinolene, terpinene, etc. were obtained.

Example II 100 parts of pinene and 7.5 parts of pulverized crude unexpanded vermiculite were charged into a three liter, triple neck flask. The flask was equipped with a thermometer, stirrer (250 R. P. M.) and a water cooled reflux condenser. The mixture in the flask was heated at 156–160° C. for a period of 10 hours. At the end of that period the mixture was cooled to approximately 60° C. and the vermiculite catalyst was filtered from the crude camphene. Camphene was then separated from the crude mixture by fractional distillation. Sixty-nine per cent of camphene and 28 per cent of other monoterpene hydrocarbons were obtained.

Example III 100 parts of pinene and 3 parts of crude unexpanded vermiculite were charged into an iron autoclave. The mixture in the autoclave was agitated at a rate of 150 R. P. M. It was then heated at 156–160° C. for a period of 10 hours. At the end of the heating period it was cooled and the vermiculite catalyst was separated from the crude camphene (oily material) by filtration. Camphene was then separated from the crude oily mixture by fractional distillation. Seventy-one per cent of camphene and 28 per cent of other monoterpenes were obtained.

Example IV 100 parts of pinene in vapor form were passed through a tube containing expanded vermiculite. The tube was 1" in diameter and 20" long. It was jacketed with a lead-tin alloy which was heated to 280° C. by means of electric heaters. The vapors were condensed as they left the tube. Camphene was separated from the crude condensed mixture by fractional distillation. Fifty-six per cent of camphene and 40 per cent of other monoterpenes were obtained.

Example V 100 parts of pinene and 7.5 parts of expanded vermiculite were charged into a 3-neck, 3-liter flask. The flask was equipped with a thermometer, water condenser and stirrer. The mixture was agitated (250 R. P. M.) and heated for 10 hours at 156–165° C. At the end of the 10-hour period it was cooled to about 60° C. and the vermiculite catalyst was filtered from the crude camphene. Camphene was then separated from the crude mixture by fractional distillation. Sixty-five per cent of camphene and 30 per cent of other monoterpenes were obtained.

In the modified procedure of Example IV it should be noted that camphene can be separated from the other vapors as they issue from the converter tube by fractional condensation, thereby avoiding any need for an independent fractional distillation.

As previously stated, either crude unexpanded vermiculite or the expanded product may be used as catalyst. The vermiculite may be used as mined or after drying at any temperature up to about 1000° C. The amount of catalyst which may be used can vary from about ½ per cent to 80 per cent of the amount of camphene. The amount of catalyst to be employed is dependent chiefly on the temperature at which it is desired to operate and the time permissible for the reaction. Temperature may be varied within a range of about eighty to three hundred degrees centigrade.

The catalyst may be added gradually to pinene during heating or it may be added all at once before heating is started. The time for conversion may be a matter of minutes or hours as illustrated by Examples IV and V.

The conversion may be carried out at atmospheric pressure or at higher pressures, and in the presence of air or a surrounding atmosphere of an inert gas such as carbon dioxide or nitrogen.

After conversion of pinene the catalyst may be separated from the resulting crude camphene by filtration, by decantation of the oil layer, or by steam distillation.

Any usual materials may be used in the equipment employed in the process. For example, an enamel-lined autoclave or one of steel or copper is satisfactory.

Vigorous agitation of the mixture during conversion is highly desirable but slow isomerization of pinene into camphene occurs even when pinene is merely heated in the presence of the catalyst.

As already indicated, crude source materials of pinene such as gum turpentine, wood turpentine, and various oils containing pinene can be directly treated by this process for conversion of their pinene content into camphene.

The yields of camphene by this process, as shown in the examples, are extremely high by comparison with yields by other catalytic procedures. Further advantages result from the fact the catalyst is inexpensive and that it requires no difficult and costly preliminary treatment to put it in condition for use. It has properties which render its separation after conversion of the pinene a simple matter requiring little labor cost.

There was nothing in the prior art, nor in the known properties of vermiculite to indicate that it would prove to be a superlative catalyst for conversion of pinene to camphene, or in fact a catalyst at all in this field.

As many apparently widely different embodiments of this invention may be made without departing from the spirit and scope thereof, it is to be understood that we do not limit ourselves to the specific embodiments thereof except as defined in the following claims.

We claim:

1. The process of isomerizing a terpene which comprises heating a terpene in the presence of vermiculite until isomerization is at least partially complete.

2. The process of isomerizing pinene which comprises heating pinene with vermiculite until conversion into camphene is at least partially complete.

3. The process of converting pinene into camphene which comprises heating pinene in the presence of at least two per cent of vermiculite, with agitation, until conversion into camphene is at least partially complete.

4. The process of preparing camphene from pinene which comprises heating and stirring pinene with not less than 2 per cent of vermiculite at a temperature no lower than 80° C. until conversion into camphene is at least partially complete, and subsequently separating camphene from the conversion mixture by distillation.

5. The process of preparing camphene from pinene which comprises passing pinene in vapor form over heated vermiculite at a temperature and vapor flow adapted to facilitate the conversion.

CLYDE O. HENKE.
GASTAO ETZEL.